United States Patent
Spies et al.

(10) Patent No.: US 10,711,164 B2
(45) Date of Patent: Jul. 14, 2020

(54) PRESSURE-SENSITIVE ADHESIVE COMPRISING A POLYMER COMPONENT AND A SACCHARIDE COMPONENT AND METHOD FOR BONDING A FIRST SUBSTRATE TO A SECOND SUBSTRATE WITH SAME

(71) Applicant: TESA SE, Norderstedt (DE)

(72) Inventors: Manfred Spies, Bad Bramstedt (DE); David Pilz, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 16/064,609

(22) PCT Filed: Nov. 24, 2016

(86) PCT No.: PCT/EP2016/078746
§ 371 (c)(1),
(2) Date: Jun. 21, 2018

(87) PCT Pub. No.: WO2017/108325
PCT Pub. Date: Jun. 29, 2017

(65) Prior Publication Data
US 2018/0362812 A1    Dec. 20, 2018

(30) Foreign Application Priority Data
Dec. 22, 2015   (DE) ............ 10 2015 226 578

(51) Int. Cl.
| | | |
|---|---|---|
| *C09J 105/00* | (2006.01) | |
| *C08F 220/18* | (2006.01) | |
| *C08F 220/20* | (2006.01) | |
| *C09J 7/38* | (2018.01) | |
| *C08K 5/1545* | (2006.01) | |
| *C09J 133/08* | (2006.01) | |

(52) U.S. Cl.
CPC ............ *C09J 105/00* (2013.01); *C08F 220/18* (2013.01); *C08F 220/20* (2013.01); *C08K 5/1545* (2013.01); *C09J 7/385* (2018.01); *C09J 133/08* (2013.01)

(58) Field of Classification Search
CPC ..................................................... C09J 105/00
See application file for complete search history.

(56) References Cited

U.S. PATENT DOCUMENTS

| | | | | |
|---|---|---|---|---|
| 3,447,954 A | * | 6/1969 | Lohse | .............. C08J 3/21 |
| | | | | 427/208.2 |
| 2010/0159131 A1 | | 6/2010 | Blum et al. | |

FOREIGN PATENT DOCUMENTS

| | | | | |
|---|---|---|---|---|
| CN | 102892853 A | | 1/2013 | |
| DE | 203 15 592 U1 | | 1/2004 | |
| EP | 0 157 455 A1 | | 10/1985 | |
| EP | 1 548 080 A1 | | 6/2005 | |
| KR | 2010 0102443 A | | 9/2010 | |
| KR | 20100102443 A | * | 9/2010 | ........... C09J 133/08 |
| WO | 2005/063906 A1 | | 7/2005 | |
| WO | 2010/104243 A1 | | 9/2010 | |
| WO | 2011/092108 A1 | | 8/2011 | |
| WO | 2011/126707 A2 | | 10/2011 | |
| WO | 2016/036632 A1 | | 3/2016 | |

OTHER PUBLICATIONS

International Search Report dated Jan. 17, 2017, dated Jan. 26, 2017.
English Translation of International Search Report dated Jan. 17, 2017, dated Jan. 26, 2017.
Office Action dated Sep. 4, 2019, issued in connection with Chinese Patent Application No. 201680079737.4.

* cited by examiner

*Primary Examiner* — Daniel H Lee
(74) *Attorney, Agent, or Firm* — Norris McLaughlin, P.A.

(57) ABSTRACT

Pressure-sensitive adhesive compound comprising a polymer component and a saccharide component, wherein the saccharide component is formed from one or more monosaccharides, disaccharides, oligosaccharides, or polysaccharides, and/or one or more modified saccharide derivatives, which can be derived from monosaccharides, disaccharides, oligosaccharides or polysaccharides by modifying one, several, or all OH groups contained in the respective saccharide.

12 Claims, No Drawings

PRESSURE-SENSITIVE ADHESIVE COMPRISING A POLYMER COMPONENT AND A SACCHARIDE COMPONENT AND METHOD FOR BONDING A FIRST SUBSTRATE TO A SECOND SUBSTRATE WITH SAME

This is a 371 of PCT/EP2016/078746 filed 24 Nov. 2016, which claims foreign priority benefit under 35 U.S.C. 119 of German Patent Application 10 2015 226 578.1 filed Dec. 22, 2015, the entire contents of which are incorporated herein by reference.

The invention relates to a pressure sensitive adhesive comprising a polymer component and also a saccharide component.

BACKGROUND OF THE INVENTION

On the basis of their rapid, clean, and simple processability, in the form of diecuts, for example, their permanent tack, and also the fact that there is no need for a curing step after application, pressure sensitive adhesive tapes are nowadays needed in diverse sectors and for enumerable applications, adhering reliably to different substrates and over a defined time period. Customary specialty products employed in industry additionally have a number of further functions to take on in addition to the adhesive bonding. For use in the electronics industry, for instance, in the region of optical bonds, for example, the requirement is for halogen-free, colorless, aging-stable pressure sensitive adhesive tapes. In the construction industry likewise, as for example in the bonding of architectural facings—and particularly of glass facings, where there are great fluctuations in temperature and light irradiation—, there are large areas of use for colorless, transparent bonds stable to weathering and to aging and stable in color, such bonds often being sited in view.

Such applications with high transparency are currently covered preferably by polyacrylate-based, hydrogenated styrene block copolymer-based or silicone-based adhesive tapes.

Over the years, the production of high-quality displays for smartphones, tablet PCs, and other electronic devices has ramped up considerably on the basis of heightened demand and optimized production conditions. Equally, the areas of application of the devices employed have seen continual growth, and such devices are more and more often used under extreme conditions. As a direct consequence of this, the requirements for inexpensive, high-quality, precisely tailored or universal bonding solutions have likewise risen.

Arising from the use of the adhesive tape for joining different materials adhesively is a demand made on the adhesive in terms of its adhesive and cohesive properties. Among the adhesive properties (surface property), the peel adhesion (resistance to peeling) is a central characteristic of adhesives and adhesive films in terms of their interaction with a relevant substrate. Another main characterizing variable are the cohesive properties, which describe the internal strength of the adhesive in the face of physical stresses, such as the behavior toward static shearing stress, for example. Because the two properties are in mutual opposition, the aim is always to find a well-balanced optimum tailored to the adherends, where it is not possible to improve both—adhesion and cohesion—at one and the same time.

Such adaptation of the adhesive materials to the service conditions (e.g., temperature, mechanical stress, or recycling) is in general complicated and difficult. Oftentimes the adhesive is optimized through appropriate combination of high molecular mass base elastomers with a very low glass transition temperature (Tg), e.g., natural rubber, synthetic rubbers, acrylate rubbers or elastic polyurethanes, with low molecular mass tackifier resins having a high Tg, based for example on rosins, terpenes or hydrocarbons. In exceptional cases it is also possible to achieve a similar outcome by modifying a high-Tg elastomer with plasticizers. Significant exclusion criteria for the selection of suitable raw materials are, additionally, the compatibility with one another and also the adaptation to the envisaged bond substrates, but with severe restriction on the raw materials appropriate.

For pressure sensitive adhesives (PSAs), the (meth)acrylate-based rubbers with high molecular weights (e.g. Mw>500 000 g/mol) represent an important class of raw material having very good properties. Such adhesives are notable for high temperature, chemical, and aging stability and are suitable, accordingly, particularly well for high-quality bonds (e.g. in the electronics sector). Preparation is accomplished customarily by copolymerization of suitable monomer mixtures in organic solvents, in aqueous emulsion or in bulk. The primary influencing variable for controlling the technical adhesive properties on the basis of the base polymer properties is above all the molecular weight of the base polymers thus produced and also the resultant glass transition temperature (Tg), which can be estimated and tailored on the basis of a suitable selection of the monomers. Suitable in general here are glass transition temperatures in the range below 0° C., but primarily between −95° C. and −30° C. for adhesives particularly.

Via the nature and the degree of crosslinking it is possible to form a network between the linear polymer chains and to further control the cohesion of the polymer matrix by using increasing crosslinking to modify the viscoelastic behavior from viscose gradually up to elastic. Through the suitable addition of crosslinkers or through the influence of radiation and/or heat, especially suitable adhesives are obtained that exhibit low degrees of crosslinking. When using radiative crosslinking, especially UV crosslinking, moreover, it must be ensured that the additives present in the adhesive formula (resins, for example) do not interact with the crosslinking reaction, hence being UV-stable and UV-transparent within the relevant range, in order to prevent unwanted side-reactions (e.g., discoloration) and uneven crosslinking.

For the purposes of formulation, the amount and nature of the additives, but particularly of tackifier resins or plasticizers, are increasingly decisive. For both raw materials, tackifier resins and plasticizers, the compounds in question are of low molecular mass, with molar masses<50 000 g/mol, but primarily<2 000 g/mol. In accordance with their function, they differ in their physical properties such that plasticizers are typically low-melting compounds with a softening point below 40° C., but more particularly are liquids, such as many oils or liquid phthalic esters, for example, which on account of their low intrinsic glass transition temperature (Tg<0° C.) reduce the overall glass transition temperature of the mixture—starting from the original high-Tg polymer such as polyvinyl chloride (PVC) or polyethylene terephthalate (PET), for example. Tackifier resins, on the other hand, especially for acrylate adhesives, have high softening points above 70° C., but typically between 90° C. and 160° C. Important representatives are terpene-, phenol-, rosin- or naphtha-based resins. When used in base polymers, their high intrinsic glass transition temperatures (Tg>30° C.) serve to raise Tg and to boost the shear strength under temperature load. Concentrations used here are between 0% and 70%, but primarily between 10% and 40%.

In formulation development, there are always many additional requirements to be met. For instance, in addition to quality and economic viability, good processing qualities in particular (especially coating, slitting, and diecutting characteristics) are an extremely important characteristic which must be ensured. Although the task identified above is already extremely complex, there is often the need, furthermore, to adapt the adhesive to specialist requirements.

In connection with their wide usage, therefore, specific single-sided and double-sided pressure sensitive adhesive tapes have increasingly also come into the focus of optical and electronic applications. The key design forms in this context comprise double-sided, single-layer, carrierless adhesive transfer strips which are lined with one or two antiadhesively coated outer plies (release liners); double-sided, two-layer or multilayer adhesive strips having a single-layer or multilayer carrier and lined with one of two antiadhesively coated outer plies; and also single-sidedly pressure sensitively adhesive strips having a single-layer or multilayer carrier, and lined with an antiadhesively coated release liner.

Especially for part-area and full-area bonds in display applications, touch sensor applications, coverglass bonds or surface protection bonds, essential importance attaches to adhesive solutions featuring high transparency and color-fastness of the bond. Within the patent literature there exists a multiplicity of applications claiming pressure sensitive materials for use in optical bonds. These are essentially polyolefin-based and polyacrylate-based pressure sensitive adhesive tapes. The pressure sensitive adhesives are preferably aqueous or solventborne polyacrylate formulations. Pressure sensitive adhesive tapes of this kind are shown in specifications WO 2005063906 A and DE 203 15 592 U. In the recent period, furthermore, technical adhesive tapes have been described for use in the electronics sector, based on solvent-free, UV-crosslinkable polyacrylates; in this regard, see EP 1548 080 A.

The transparency, as an optical property of the material, is critically influenced by the transmittance $\tau_\lambda$ or the absorbance $A_\lambda$ in accordance with the Beer-Lambert law. This describes the attenuation of the intensity $I_0$ of the light of a defined wavelength $\lambda$ penetrating the material to the value of I. The absorbance is dependent on the path length d of the material, on the decadic molar attenuation coefficient $\varepsilon_\lambda$ of the absorbing substance, and on its concentration c in the sample material. $A_\lambda$ is given by the equation (I), which is likewise valid for the UV range and can therefore be employed for assessing an adhesive component for its suitability when deployed in UV crosslinking:

$$A_\lambda = lg(1/\tau_\lambda) = lg(I_0/I) = \varepsilon_\lambda c d \quad (I)$$

Adhesive bonds are referred to as transparent (in the sense of the invention presented in the present specification) for a transmittance $\tau_\lambda > 95\%$, preferably $\tau_\lambda > 99\%$. A key role is also played here by the coloredness of a substance with regard to the transparency, since the coloredness represents a wavelength-dependent modification, occurring in the visible range, of the attenuation coefficient $\varepsilon_\lambda$. In simplified form, the coloristic value of a sample is indicated in the form of coordinates in the three-dimensional L*a*b* color space, which covers the range of colors perceptible to the human eye. Here, L* describes the coordinate axis for lightness, a* that for green-red, and b* that for yellow-blue. For resins, positive b* values are particularly frequent, since virtually all resins have a certain yellow coloration. This is manifested particularly in so-called high-build applications (e.g., joint assembly between the edges of two glass plates) in view of the high path length d.

Likewise always visible for example are defects in the bond caused by inclusions of air or of impurities, because of light scattering (haze). This light scattering may come about as a result of physical processes (e.g., surface unevenness/scratches) or chemical processes (e.g., uneven distribution/migration of formula components within the adhesive, or uptake of moisture). One measure of the scattering of a layer or of any transparent object under measurement is its haze, also called large-angle scattering. This, according to ASTM D 1003, is the fraction of the total light passing through an object under measurement that within the object under measurement undergoes a directional deflection of more than 2.5°, in other words being scattered out of the directed beam. Haze values of H>5%, in the narrower sense even H>3%, are ultimately unusable for optical bonds and are not tolerated in the adhesive film/display of the customer, in the same way as discolorations (e.g. |b*|>1) or hazing (caused by aging-related moisture uptake, for example).

It is these particular requirements asked of visible bonds, particularly in transparent, optical applications, where a great number of the classes of raw materials used preferentially in adhesive tapes suffer failure. In particular, all tackifier resins based on rosins, polyterpenes or hydrocarbons exhibit strong intrinsic coloration or a temporary change in color or transparency under the action of light, temperature, humidity or oxygen. A factor which causes no problems in other adhesive tape applications, when, for example, the bond site is placed out of sight, is a significant exclusion criterion for transparent applications (see EP 157 455 A).

In spite of their particular tack-enhancing effect, therefore, hardly any tackifier resins are employed in specialist applications such as display bonds, and the greatly restricted possibilities of resin-free systems have to be accepted. Occasionally, reducing the layer thickness of the adhesive strip, so producing a boost to the transparency in accordance with the Beer-Lambert law, offers a compromise. The other side of the coin, however, is a loss of technical adhesive performance and latitude for compensating uneven or specially shaped substrates with different layer thicknesses, or adequately withstanding pressure and jolting loads which the adhesive volume is required to accommodate.

Another exception is formed by compositions for applications with less stringent transparency requirements, comprising one of the few remaining resins which is colorless or has low levels of coloration, such as hydrogenated rosin derivatives, for example. In many cases, however, even these refined resins display a tendency to change color due to aging, and within the adhesive must be stabilized by further additives such as primary and secondary aging inhibitors and also UV absorbers, and/or the effect must be compensated by pigmentation. Examples of aging inhibitors contemplated include sterically hindered phenols and amines, phosphites and organic sulfides. Preference is given to using sterically hindered phenols, such as those of the Irganox® tradename and aging inhibitors where primary and secondary aging inhibition effects are united in one molecule.

As a result of using aging inhibitors, it is usual for new, unwanted side effects to be generated elsewhere (e.g., detractions from the technical adhesive performance profile, no possibility of UV crosslinking). Moreover, the addition of aging inhibitors does not offer permanent protection, but only delays the unwanted effect for a certain time. Storage or processing under hot and humid conditions (e.g., in the case of production in Asia), or service under critical conditions (e.g., in sauna interiors, close to hot machinery, or in outdoor applications with high UV load) is then possible only for a certain time.

For hydrogenated resins to be used, however, they must be prepared by involved methods (e.g., catalytic hydrogenation under high pressure of up to 200 bar and at high temperatures) and, because of their low polarity, they are not compatible with all types of polymer. It is specifically, however, the compatibility between resin and base polymer that is a further key limiting factor in the selection of resins. Even slight incompatibilities (inadequately aligned solubility properties) of resin and polymer can lead to the development of hazing because of phase separation (primarily separation of the high molecular mass resin constituents). If the molecular structures of polymer and resin are known, the solubility properties of the compounds can be computed on the basis of tabulated values for functional groups. Good agreement between the values is an indicator of good compatibility. In the case of poor compatibility, suitable chemical modification to the molecular structure can improve the compatibility.

A rough impression of the solubility properties is supplied by the cloud point measurement methods of MMAP (of resins in a 2:1 mixture (vol %) of methylcyclohexane and aniline, corresponding to the in-house method H90-5 of Hercules) and DACP (of resins in a 1:1 mixture (wt %) of xylene and 4-hydroxy-4-methyl-2-pentanone (diacetone alcohol) in accordance with the in-house method H90-4a of Hercules). In each of these cases a determination is made of the temperature at which the resin begins to become insoluble. Low values for MMAP (<40° C.) describe highly aromatic resins, whereas high MMAP values (>75° C.) indicate aliphatic or hydrogenated test substances. And low DACP values (<0° C.) mark out high-polarity resins with high specific adhesion to polar substrates such as polyester, aluminum or steel, whereas high DACP values (>0° C.) mark out weakly polar resins for low-polarity substrates.

None of the specifications cited, however, discloses an approach which as well as the establishment of the specific technical adhesive and performance profile also exhibits high transparency, aging resistance, and color stability, and ensures improved coating behavior in relation to processability, quality, and economic viability. A common report is that the resin component adversely affects the color and the aging stability of the PSA.

There is therefore a need, particularly, but not limited, to application in the electro-optical sector—to provide PSAs which exhibit an excellent balance between cohesive and adhesive properties and at the same time exhibit enhanced transparency, enhanced aging resistance, and enhanced color stability. Moreover, in view of the worldwide scarcity of resources, there is an additional problem of switching to a greater extent to biobased or recycled raw materials. In addition, physical properties such as degree of purity (color), odor, glass transition temperature, economic viability, compatibility with other formulation constituents, and reduced hazard potential, significantly different from the properties known from the prior art, are desirable, solving the disadvantages associated with them.

In view of the additional optical requirements (high transparency, low coloredness) to the mechanical requirements (technical adhesive performance profile such as adhesion and cohesion, for example) asked of adhesive tapes for visible and/or optical bonds, but preferably in the optical, optoelectronics or architectural facing construction sector, as for example for display panel bonds, touch sensors/panels, cover glass bonds or surface protection strips, however, the use of colorless tackifier resins would very frequently be desirable. Factors in need of improvement here are primarily those of haze, color or color stability of PSAs modified with tackifier resin, and of adhesive tapes containing tackifier resin, and more particularly the intrinsic coloring, the color stability and the compatibility of tackifier resins with the various adhesive components used.

It has been possible in accordance with the invention to achieve the object by means of a pressure sensitive adhesive as shown in more detail in the main claim. Dependent claims referring back to this claim relate to advantageous embodiments of the pressure sensitive adhesive. A further subject of the invention is the use of the pressure sensitive adhesive for bonds of substrates and/or in devices for optical and electronic applications, or in the construction industry, and also advantageous developments of this use.

SUMMARY OF THE INVENTION

In accordance with the invention it has been found that the object described could be achieved through the use of a pressure sensitive adhesive comprising at least one saccharide component and also a polymer component, as set out in more detail below. The resulting adhesive film possesses the desired properties, particularly the technical adhesive properties and optical properties.

The saccharide derivatives here serve as a substitute for high-Tg tackifier resins in poly(meth)acrylate PSAs and, respectively, in adhesive tapes produced with such PSAs.

In accordance with the invention, the pressure sensitive adhesive comprises a polymer component, accounting for at least 30 wt % of the adhesive, up to 50 wt % (based on the adhesive) of a saccharide component, and, optionally, further components or additives. With preference the saccharide component is included at 5 to 40 wt % in the adhesive.

DETAILED DESCRIPTION

The saccharide component may be formed of one or more mono-, di-, oligo- or polysaccharides and/or of one or more modified saccharide derivatives, and the mono-, di-oligo-, or polysaccharides and the modified saccharide derivatives are referred to collectively as saccharide derivatives.

Modified saccharide derivatives in the sense of this specification are those compounds which can be derived from mono-, di-, oligo- or polysaccharides by modification of one, two or more or even all the OH groups present in the saccharide. The modified saccharide derivatives are therefore particular polyol derivatives, specifically substituted saccharides. In the case of two or more substituted OH groups, the substituents may be the same (identically substituted saccharide derivatives) or different (mixedly substituted saccharide derivatives).

In the context of this specification, the unsubstituted mono-, di-, oligo- or polysaccharides from which the saccharide derivatives can be derived are also referred to, for the purposes of linguistic distinction, as saccharide skeletons.

As the saccharide component it is possible to use one saccharide derivative; it is also possible, however, to use two or more saccharide derivatives at the same time. In the case of two or more saccharide derivatives used, they may be selected such that only saccharide derivatives having identical number-average molar masses $M_n$, only those having different number-average molar masses $M_n$, or both those having identical and those having different number-average molar masses $M_n$ are employed. The additives, furthermore, may be selected such that only identically substituted, or only mixedly substituted, or both identically substituted and mixedly substituted saccharide derivatives are employed.

Surprisingly it has been found that the saccharide component and the polymer component are completely compatible with one another, thus giving a colorless, transparent, color-stable, aging-stable pressure sensitive adhesive. Accordingly, the invention relates to a colorless, saccharide-modified pressure sensitive adhesive which is excellent for use in pressure sensitive adhesive tapes for the electronics industry, for example, on account in particular of its light stability, temperature stability, moisture stability, and aging stability. The saccharide-modified adhesives may be prepared solventlessly by UV polymerization or from polymer melts or from dispersion or solution.

The saccharide component is preferably formed by one or more saccharide derivatives which as pure compounds in the visible ($\lambda$=380 nm to 780 nm) range are only faintly colored (($L^*\geq 95$, $|a^*|<5$ and $|b^*|<5$), more preferably colorless ($L^*\geq 99$, $|a^*|<1$ and $|b^*|<1$). Further preferred versions are only faintly colored, preferably colorless, alternatively or additionally, in the ultraviolet range as well ($\lambda$=10 nm to 880 nm).

In a further advantageous embodiment of the invention, the saccharide derivatives used have a chiral construction, are optically active, and rotate the polarization plane of polarized light on transmission.

In one advantageous embodiment of the invention, the PSA comprises a saccharide component composed of at least two saccharide derivatives, it also being possible for three or more saccharide derivatives to be used. The ratio of the amounts of the individual saccharide derivatives may in principle adopt any value, but preferably, in the case of a mixture of two saccharide derivatives, they are present in a ratio of 10:90 to 50:50. The use of a mixture, especially in the stated quantitative ratio, leads to improved compatibility with the base polymer, by suppressing any possible crystallization tendency and separation in the adhesive.

In a further advantageous embodiment of the invention, the PSA comprises not only the saccharide component—in the sense of the abovementioned further components of the PSA—but also a tackifier resin component (for the definition of tackifier resins, see introductory section). The ratio of the amounts of the saccharide component to the tackifier resin component may in principle adopt any value, but is preferably between 10:90 and 90:10. The use of a saccharide component and of a tackifier resin component, especially in the stated quantitative ratio, leads likewise to improved compatibility with the base polymer by suppressing any possible crystallization tendency and separation in the adhesive.

Examples of tackifier resins which can be used outstandingly in accordance with the invention are aliphatic hydrocarbon resins, aromatic hydrocarbon resins, aliphatic-aromatic hydrocarbon resins, terpene resins, phenolic resins, terpene-phenolic resins, rosins, acrylate resins, polyketone resins.

If tackifier resins are used, they are preferably colorless and stable to aging.

In another advantageous embodiment of the invention, tackifier resins are absent (tackifier resin-free pressure sensitive adhesive).

With preference the saccharide derivate used in accordance with the invention is notable for a low level of coloredness ($L^*\geq 95$, $|a^*|<3$ and $|b^*|<3$), but more preferably by absolute coloredness in the visible range ($L^*\geq 99$, $|a^*|<1$ and $|b^*|<1$), or in the wavelength range necessary for the respective application (e.g. UV, IR or at certain laser light wavelengths). In the particularly preferred embodiment of the invention, moreover, the saccharide derivative displays high aging, temperature and/or light stability and also high biodegradability, and accordingly retains its excellent physicochemical properties both during storage in pure form and permanently in the adhesive.

The saccharide derivative used in accordance with the invention is further characterized in particular in that it has a molar mass, or molar mass distribution, typical of tackifier resins and/or plasticizers, in other words a molar mass or molar mass distribution which is less than 100 000 g/mol, preferably in the range between 100 and 10 000 g/mol, and more preferably between 500 and 3500 g/mol. The saccharide derivatives used consist advantageously of modified or unmodified polyols which derive from open-chain or closed-chain saccharide skeletons. Preferred saccharide skeletons constitute the structural elements of natural or synthetic mono-, di-, oligo- or polysaccharides.

Employed very preferably in the sense of the invention as saccharide derivatives, in accordance with the invention, are mono-, di-, and oligosaccharide skeletons which derive from one or more representatives, selected independently of one another, from the group consisting of monosaccharides, such as allose, altrose, glucose, mannose, gulose, idose, galactose, talose, psiocose, fructose, sorbose, tagatose, ribose, arabinose, xylose, lyxose, ribulose, xylulose, erythrose, threose, erythrulose, glyceraldehyde, dihydroxyacetone, disaccharides, such as cellobiose, gentiobiose, isomaltose, isomaltulose, lactose, lactulose, laminaribiose, maltose, maltulose, melibiose, neohesperidose, neotrehalose, nigerose, rutinose, sambubiose, sophorose, sucrose or trehalose, trisaccharides, such as fucosidolactose, gentianose, isokestose, kestose, maltotriose, manninotriose, melezitose, neokestose, panose, raffinose, umbelliferose, or of oligosaccharides, such as cyclodextrins, for example, short-chain polysaccharide derivatives, e.g., of starch, glycogen, cellulose, hemicellulose, pectin, chitin, callose, and further homo- and heteroglycans, mixtures of the aforementioned, such as starch hydrolysates, hemicellulose hydrolysates, glycogen hydrolysates, cellulose hydrolysates, pectin hydrolysates, chitin hydrolysates, callose hydrolysate, other glycosides, alditols (sugar alcohols), such as mannitol, sorbitol, galactitol, fucitol, iditol, inositol, cyclohexanehexol, cyclopentanepentanol, arabitol, xylitol, ribitol, erythritol, threitol, glycerol, sorbitan, higher sugar alcohols, such as isomalt, maltitol, lactitol, or hydrogenated starch hydrolysates, hydrogenated cellulose hydrolysates or are identical with these, this enumeration not being conclusive.

In a very preferred way, the one or one of the two or more saccharide derivatives is selected from the list made up of glucose acetate, glucose benzoate, sucrose acetate, sucrose benzoate, olestra. Olestra is a fat substitute from the group of the sucrose esters, specifically a mixture of hexa, hepta, and octa esters from the esterification of sucrose with the fatty acids from rapeseed oil, sunflower oil or palm oil. Through suitable selection of the fatty acid chains, their number, length, and degree of saturation, it is possible to produce olestra with virtually any melting point and any desired viscosity.

With preference the saccharide component has a softening point between −150° C. and 180° C. and/or a glass transition range (Tg) between −200° C. and 130° C., preferably between −100° C. and −50° C., or alternatively preferably between 80° C. and 120° C.

In accordance with the invention the functional groups are selected preferably such that there is an adaptation of the physical properties, known to the skilled person, to the base polymer on which the adhesive is based, in the sense that, preferably, similar solubility properties are established, hence resulting in high compatibility with the other components of the PSA. A simple verification of the polarity or aromaticity is accomplished here preferably by means of cloud point determination (MMAP and DACP methods). At the same time, by selecting suitable functional groups and/or functionalization, it is possible to bring about the adaptation of other important physical properties, in respect, for instance, of the softening point and glass transition temperature, specifically such as to obtain, preferably, a compound with plasticizing effect [low softening point (<40° C.) and Tg (<0° C.)], but more preferably with the effect of a tackifier resin [high softening point (>40° C.) and high Tg (>0° C.)].

Functional groups suitable in accordance with the invention on the saccharide skeleton are obtained by modifying the OH groups and/or the carbon atoms carrying OH groups by means, for example, of alkylation, dehydration, oxidation to the aldehyde, to the ketone or to the acid, peroxy acid or to the acid anhydride, by esterification, etherification, by halogenation, by lactonization, by acetalization or hemiacetalization, by amination, hydrazide formation, or by complexing of metal ions, this enumeration not being conclusive. In accordance with the invention, therefore, the corresponding modification products of the aforesaid saccharide skeletons can be realized in such a way that one obtains them, for example, from dehydro sugar, thio sugar, amino sugar, sugar acids, sugar ethers, halogen sugar, but more preferably from sugar esters, and uses these in accordance with the invention.

In accordance with the invention, esterification, as a chemical modification to the saccharide skeleton that is particularly simple to realize in technical terms, represents the preferred functionalization method for producing a saccharide derivative which can be used in accordance with the invention. The reaction partners employed in the case of esterification of the OH groups present on the skeleton, with formation of mono-, di-, oligo- or polyester, these partners (acids or suitable acid derivatives) being, for example, acid halides, acid anhydrides or esters, include the following:

derivatives of inorganic acids—such as, for example, of the sulfur series (sulfuric acid, sulfurous acid, thiosulfuric acid, and others), of the phosphorus series (phosphoric acid, phosphonic acid, phosphorous acid)—, but preferably derivatives of carboxylic acids, such as saturated fatty acids and shorter monocarboxylic acids, examples being formic acid, acetic acid, propionic acid, butyric acid, valeric acid, caproic acid, enanthic acid, caprylic acid, pelargonic acid, capric acid, undecanoic acid, lauric acid, myristic acid, pentadecanoic acid, palmitic acid, margaric acid, stearic acid, nonadecanoic acid, arachidic acid, heneicosanoic acid, behenic acid, lignoceric acid, cerotinic acid, montanic acid, melissic acid, unsaturated fatty acids such as, for example, acrylic acid, methacrylic acid, palmitoleic acid, petroselinic acid, oleic acid, elaidic acid, vaccenic acid, gadoleic acid, icosenoic acid, cetoleic acid, erucic acid, nervonic acid, linoleic acid, linolenic acid, calendic acid, punicic acid, eleostearic acid, arachidonic acid, timnodonic acid, clupanodonic acid, cervonic acid, resin acids based on diterpenes—for example, abietanes, pimaranes, isopimaranes, labdanes—or triterpenes—for example dammaranes, tirucallanes, oleananes, ursanes, lupanes—, hydrocarboxylic acids, as for example malic acid, 2-hydroxy-4-methylmercaptobutyric acid, glycolic acid, isocitric acid, mandelic acid, lactic acid, tartronic acid, tartaric acid, citric acid, β-hydroxybutyric acid, mevalonic acid, gallic acid, 4-hydroxybutyric acid, polyhydroxybutyric acid, salicylic acid, 4-hydroxybenzoic acid, amino acids, as for example alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and valine, di-, tri- and oligocarboxylic acids, examples being oxalic acid, malonic acid, succinic acid, glutaric acid, adipic acid, pimelic acid, suberic acid, azelaic acid, sebacic acid, undecanedioic acid, dodecanedioic acid, brassylic acid, tetradecanedioic acid, thapsic acid, citric acid, aconitic acid, isocitric acid, trimesic acid, trimellitic acid, tartronic acid, tartaric acid, malic acid, α-ketoglutaric acid, oxalecetic acid, phthalic acid, isophthalic acid, terephthalic acid, glutamic acid, aspartic acid, maleic acid, fumaric acid, aromatic carboxylic acids, such as benzoic acid, phthalic acid, isophthalic acid, terephthalic acid, salicylic acid, fusaric acid, gallic acid, mandelic acid, phenylacetic acid, shikimic acid, benzenesulfonic acid, sulfanilic acid, cinnamic acid, this above enumeration not being conclusive. Particularly preferred from this group are the derivatives of aromatic carboxylic acids.

Another chemical modification to the saccharide skeleton that is easy to realize technically is represented, in accordance with the invention, by etherification as a preferred functionalization method. The mono-, di-, oligo- or polyethers formed in the etherification of one or more of the OH groups present on the skeleton may be functionalized in such a way that the functionalized polyol carries one or more groups—for example, methoxy, ethoxy, propoxy, butoxy, pentoxy, hexoxy, heptoxy, octoxy, nonoxy, decaoxy, undecaoxy, dodecaoxy, tridecaoxy, tetradecaoxy, pentadecaoxy, hexadecaoxy, hexadecaoxy, octadecaoxy, cyclopentaoxy, cyclohexaoxy, phenoxy, benzoxy, p-methoxybenzoxy, 3,4-dimethoxbenzoxy, triphenylmethyloxy, tert-butoxy, allyloxy, allyloxycarbonyloxy, methoxymethyloxy, methylthiomethyloxy, (2-methoxyethoxy)methyloxy, benzyloxymethyloxy, β-(trimethylsilyl)ethoxymethyloxy, tetrahydropyranyloxy, methylphenoxy, trimethylsilyloxy, triethylsilyloxy, tert-butyldimethylsilyloxy, triisopropylsilyloxy, tert-butyldiphenylsilyloxy, polyether structures such as polyethylene glycols—and/or ether groups which derive from fluorine compounds and/or chlorine compounds and/or iodine compounds, and are notable overall in that their polarity is different, but preferably less, than that of the esters stated in accordance with the invention.

Other modifications to the saccharide skeleton that can be realized technically and are advantageous in accordance with the invention are acetalization or hemiacetalization, as for example the formation of benzylidene, isopropylidene, and cyclohexylidene and/or cyclopentylidene acetals.

As polymer component in the PSAs of the invention it is possible in principle to use all thermoplastics, elastomers, and thermoplastic elastomers that are known to the skilled person, especially polyacrylates, styrene block copolymers (e.g., styrene-isoprene-styrene, styrene-butadiene-styrene, styrene-ethylene-butadiene-styrene or styrene-butadiene-butylene-styrene), natural rubbers, polyisoprenes of synthetic origin or polybutadienes, polyurethanes, silicone-based polymers. Preferred in accordance with the invention are solvent-based polyacrylates, solvent-free polyacrylates, and also aqueously dispersed polyacrylates with a solids content of between 25% and 75%, preferably between 50% and 70%.

The polymers used as polymer component in accordance with the invention preferably have weight-average molecular weights of more than 100 000 g/mol, preferably of more than 250 000 g/mol. The weight-average molecular weights of the polymers used may be up to several tens of millions of g/mol, and are situated preferably in the range of up to 8 000 000 g/mol.

Examples of polymers which can be used advantageously are those having a long-chain polymer mode with a weight-average molecular weight of at least 500 000 g/mol and not more than 3 000 000 g/mol, preferably of at least 800 000 g/mol and not more than 2 000 000 g/mol.

As monomers or monomer mixtures which can be (co)polymerized in the preparation of the polymers of the invention, consideration is given to all of the radically or ionically polymerizable monomers containing polymerizable groups, preferably C=C double bonds, that are known to the skilled person. Particularly preferred here are α,β-unsaturated carboxylic acids and their derivatives, of the general structure

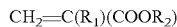

for use as reactants, where $R_1$=H (acrylic acid derivatives) or $CH_3$ (methacrylic acid derivatives) and $R_2$=H or linear, branched or cyclic, saturated or unsaturated alkyl radicals having 1 to 30, preferably having 4 to 18, carbon atoms, with or without additional substituents such as hydroxyl, $C_1$-$C_6$ alkoxy, halogen, hydroxyalkyl, amino, alkylamino, acylamino, carboxyl, alkoxycarbonyl, sulfonic acid, sulfonic ester, alkylsulfonyl, arylsulfonyl, sulfonyl, and sulfonamide groups.

In one advantageous embodiment of the invention, acrylic and methacrylic acid-free polymers are used. Acrylic and methacrylic acid-free systems do not act corrosively on semiconductor materials such as ITO surfaces, for example, and are preferably employed where, for example, noncorrosive systems are desired, as in the sector of the electronics industry, for example.

Monomers which are used very preferably within the above formula $CH_2$=$C(R_1)(COOR_2)$ comprise acrylic and methacrylic esters having alkyl groups consisting of 4 to 18 carbons. Specific examples of compounds employed, without using this enumeration to impose any restriction, are as follows: methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate, methyl 3-methoxyacrylate, 3-methoxybutyl acrylate, 2-phenoxyethyl methacrylate, butyldiglycol methacrylate, ethylene glycol acrylate, ethylene glycol monomethylacrylate, methoxy-polyethylene glycol methacrylate 350, methoxy-polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide, and also N,N-dialkyl-substituted amides, such as, for example, N,N-dimethylacrylamide, N,N-dimethylmethacrylamide, N-benzylacrylamides, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether, vinyl isobutyl ether, vinyl esters, such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, α-methylstyrene, o- and p-methylstyrene, o-butylstyrene, 4-n-butylstyrene, 4-n-decylstyrene, 3,4-dimethoxystyrene, macromonomers such as 2-polystyrene-ethyl methacrylate (molecular weight $M_w$ of 4000 to 13 000 g/mol), polymethyl methacrylate-ethyl methacrylate ($M_w$ of 2000 to 8000 g/mol).

Additionally it is possible in principle in the sense of the invention to use all compounds with vinylic functionalization that are copolymerizable with the above-stated monomers.

The monomers may advantageously also be selected such that at least some of them contain functional groups which support subsequent radiation-chemical crosslinking (by electron beams, UV, for example) (and known as "copolymerizable photoinitiators"). Examples of suitable copolymerizable photoinitiators are benzoin (meth)acrylate and (meth)acrylate-functionalized benzophenone derivative monomers which support crosslinking by electron bombardment, as for example tetrahydrofurfuryl (meth)acrylate, N-tert-butyl(meth)acrylamide, allyl (meth)acrylate.

In one preferred embodiment of the method of the invention, the monomer mixture comprises at least one acrylic and/or methacrylic ester. With particular preference the monomer mixture comprises at least 70 wt % of at least one acrylic and/or methacrylic ester. As initiators for the radical polymerization for preparing the polymers it is possible to use all customary initiators known for acrylates or other monomers. The production of C-centered radicals is described in Houben Weyl, Methoden der Organischen Chemie, vol. E 19a, pp. 60-147. These methods may be employed in analogy. Examples of radical sources are peroxides, hydroperoxides, and azo compounds; a number of nonexclusive examples of typical radical initiators here include potassium peroxodisulfate, dibenzoyl peroxide (DPO), cumene hydroperoxide, cyclohexanone peroxide, di-tert-butyl peroxide, azodiisobutyronitrile (AIBN), cyclohexylsulfonyl acetyl peroxide, diisopropyl percarbonate, tert-butyl peroctoate, benzopinacol. In one very preferred variant the initiators are added in a plurality of stages, so that the conversion is boosted to more than 90%. The residual monomer content remaining in the polymer can be lowered accordingly to less than 10 wt %.

The polymerization can also be carried out as a UV polymerization, with the polymerization initiated by corresponding irradiation. For this purpose it is advantageous to add corresponding photoinitiators—known in principle for acrylates or other monomers—to the monomer mixture to be polymerized.

The initiators can be added to the monomer solution advantageously before or at the start of the polymerization; it is also possible for initiators to be reintroduced during the polymerization. Likewise possible is addition to initiator-containing polymers. The initiators are used in the reaction solution preferably at a fraction of 0.001 to 1 wt %, more preferably of 0.025 to 0.1 wt %, based on the monomer mixture.

The initiators used for initiating the polymerization are preferably selected such that they have a low tendency to form side chains in the polymers; their grafting activity is preferably below a value of $\varepsilon < 5$ at the temperature of the reaction mixture on addition of the initiator. Toward the end of the polymerization, final initiation with a high-grafting-activity initiator is appropriate in order to bring the residual monomer fraction close to 0% or even to eliminate it entirely.

Solvents which can be employed in connection with this invention are in principle all solvents familiar to the skilled person for the implementation of polymerizations. Water is possible in the same way as organic solvents, especially aliphatic or aromatic hydrocarbons, esters, and ethers. Examples of organic solvents which are well-suited are acetone, benzine (special boiling point spirit), ethyl acetate, methyl ethyl ketone, toluene, xylene, butyl acetate. Mixtures are likewise conceivable. The solvent (mixture) is preferably selected such that the polymerization can be carried out under conditions of evaporative cooling and that the transfer constant to the solvent is adjusted so that the molecular weight is consequently controlled.

To prepare the PSA of the invention, an advantageous procedure possible is to mix the polymer component and the saccharide component in a solvent or in bulk, with the mixing ratio between saccharide component and polymer component being advantageously between 1:20 and 20:1.

As and when required it is possible for further additives known to the skilled person to be added to the PSA of the invention in order to adapt the product properties; examples include tackifier resins, crosslinking agents, aging inhibitors, antioxidants, plasticizing resins, rubbers, fillers, flame retardants, oils or emulsifiers, this enumeration not being conclusive. With these additives it is possible, for example, when using the PSA in an adhesive tape, to influence the technical adhesive properties in a desired way and/or to introduce a further property into the adhesive tape.

Chemical and/or physical crosslinking of the PSA takes place advantageously, particularly when the PSA is in the form envisaged for the application—as a layer in an adhesive tape, for instance.

For the crosslinking it is possible to use all reagents and techniques known to the skilled person. Depending on the reagent and/or technique, then, at least one kind of a (co)monomer capable of crosslinking selected is one which carries a functionality with corresponding suitability. Conceivable crosslinking techniques are thermal and/or radiation-chemical techniques, which are initiated, for example, via UV or electron beams. To support these crosslinking techniques, it is possible to employ the customary prior-art auxiliaries such as catalysts and/or initiators.

Chemical crosslinkers very preferably mediate formation of a network. For this purpose, at least one kind of a crosslinker is added to the adhesive formulation. Particularly suitable crosslinkers in accordance with the inventive method are polyfunctional, more particular di-, tri- or tetrafunctional isocyanates or polyfunctional, more particularly di-, tri- or tetra-functional epoxides. Very favorably use may likewise be made of metal chelate compounds (e.g.: aluminum acetylacetonate). Use may also be made, however, of all further polyfunctional, more particularly di-, tri- or tetra-functional compounds, familiar to the skilled person, which are capable of crosslinking, in particular, polyacrylates and saccharide derivatives, but preferably polyacrylates and saccharide derivatives that carry OH and COOH groups. Moreover, silanes, especially trialkoxyorganosilanes, which optionally carry a reactive functionality as part of their organic radical, can be employed.

For optional UV crosslinking it is advantageous if photoinitiators have been added to the PSA for crosslinking.

Also possible are combinations of different crosslinking concepts or crosslinkers substances. Accordingly, the multimodal, more particularly bimodal (co)polymers may also comprise two or more different comonomer kinds which are capable of crosslinking.

Depending on field of application and desired properties of the PSA of the invention, it may have been admixed with further components and/or additives, in each case alone or in combination with one or more other additives or components. Very preferably these additives and/or components are selected such that they are colorless and stable toward aging. Coloring additives as well are conceivable in accordance with the invention, if desired, but should preferably be selected such that they retain their color over time and do not discolor. For high-transparency PSAs, it is usual to forego haze-inducing or colored additives.

Depending on field of application, the PSAs may be blended accordingly. Hence the PSA of the invention may comprise, for example, pulverulent and granular, in particular also abrasive and reinforcing, fillers, dyes, and pigments such as, for example, chalks ($CaCO_3$), titanium dioxide, zinc oxides and/or carbon blacks. Furthermore, various organic fillers may be included.

Suitable additives for the PSA of the invention are also—selected independently of other additives—unexpanded hollow polymer spheres, solid polymer spheres, hollow glass spheres, solid glass spheres, hollow ceramic spheres, solid ceramic spheres and/or solid carbon spheres ("carbon microballoons").

The PSA of the invention may further comprise flame retardants, low-flammability fillers, an example being ammonium polyphosphate; electrically conductive fillers, examples being carbon black, carbon fibers and/or silver-coated spheres; thermally conductive materials such as, for example, boron nitride, aluminum oxide, silicon carbide; ferromagnetic additives, as for example iron(III) oxides; organic renewable raw materials such as wood flour, for example, organic and/or inorganic nanoparticles, fibers; compounding agents, aging inhibitors, antioxidants, light stabilizers, UV protectants and/or ozone protectants, oils, emulsifiers, and the like.

Optionally it is possible for plasticizers to be included. Examples of plasticizers which can be admixed are (meth) acrylate oligomers, phthalates, cyclohexanedicarboxylic esters, water-soluble plasticizers, plasticizing resins, phosphates or polyphosphates.

The addition of silicas, advantageously of precipitated silica with surface modification by dimethyldichlorosilane, can be utilized in order to adjust the thermal shear strength of the PSA.

The PSA in the pressure-sensitive adhesive products of the invention is preferably in the form of a layer. PSA coating may take place in principle from solution or solventlessly, more particularly from the melt.

The layer thickness of the PSA in these products is not subject to any particular restriction. In one particular embodiment, this invention embraces pressure sensitively adhesive products whose PSA has a layer thickness of at least 5 µm, preferably at least 30 µm, more preferably still at least 100 µm. Surprisingly it has been found that the pressure sensitively adhesive products, in spite of high layer thicknesses, can be produced in very high optical quality in relation to coating pattern, absence of bubbles, and freedom from flow tracks, and that they are, in particular, colorless, transparent, and stable toward aging.

The PSA in layer form may in particular be part of a pressure sensitive adhesive tape comprising one or more layers of this PSA. In a first variant, the tape consists only of the layer of PSA (and is called an "adhesive transfer tape"); this tape, for better handling and winding qualities, may optionally be provided on one or both sides with a temporary liner material that is removed again for use. In a second variant, the tape consists of at least one layer of the PSA of the invention and a carrier material (single-sided adhesive tape), in which case, again, the layer of PSA may have been given a temporary lining. In a third variant, there is at least one PSA layer of the invention, an inner layer—more particularly a carrier layer—and also a second outer layer of adhesive—more particularly a layer of PSA—which may be identical to or different from the first PSA layer of the invention (double-sided adhesive tape). The double-sided adhesive tape may have temporary lining on one or both adhesive sides.

The single-sided and double-sided adhesive tapes may, in further configurations, have additional layers further to those already stated.

If a carrier material is employed, the materials known to the skilled person are used, such as films, paper, laid scrims, nonwoven webs and/or woven fabrics, the coating being applied to one or both sides. Preferred for use for the purposes of the invention are transparent carrier materials having haze values<5%, but more preferably <3%, with transmittance values>95%, but more preferably >97%, and, with particular preference, carriers of low relative coloredness, preferably L*≥99, |a*|<1 and |b*|<1. Without wishing to subject the selection below to unnecessary restriction, carrier materials such as, for example, polyethylene, polypropylene, polycarbonate, polyacrylate, polymethylacrylate, polyester or glass are especially suitable for the purposes of the invention as transparent, colorless carrier materials. Additionally suitable are transparent polymers with conductive modification—such as, for example, conductive transparent polyethylene terephthalate (PET)—and also transparent conductor and semiconductor materials—such as, for example, indium tin oxide (ITO).

In the case of the films, the films known to the skilled person are used in particular, preferably polyethylene, polypropylene, polyvinyl chloride, and other polymers and copolymers customary for the application, which may be used in both single-layer and multilayer formats. In the case of multilayer systems, the composition and the thickness of the individual layers may vary.

Monoaxially and biaxially oriented polypropylenes are frequently employed for applications where a defined tear strength is of not inconsiderable importance.

Monoaxially oriented polypropylenes exhibit particularly high tear resistance and low stretch in machine direction. In order to obtain uniform strength values in machine and cross directions, films must be biaxially oriented.

Both monoaxially and biaxially oriented polypropylenes and polyethylenes are particularly suitable as carrier material for the invention. The draw ratios are guided here by the corresponding requirements.

Both blown film and flat film can be used.

In order to ensure sufficient adhesion of the adhesive on the carrier material, the surface energy of the side to be coated ought to be situated within a defined range. This can be ensured either via additional coating with a primer, or via a surface treatment. Preference is given to a corona or flame pretreatment with which the desired surface energies can be achieved. The surface energies ought to be in a range from 25 to 50 mN/m, preferably 30 to 45 mN/m.

To improve the anchorage of the PSAs on the carrier material, said material may be corona-pretreated or one or both sides.

Furthermore, the adhesive coating may be applied to a release material, if the layer of adhesive, especially after crosslinking, is to be used as a carrierless, double-sidedly adhesive self-adhesive tape. On the coating side, the surfaces of the carriers may have been chemically or physically pretreated, and the reverse side thereof as well may have been subjected to an antiadhesive physical treatment or coating. Lastly, the carrier material in web form may be a double-sidedly antiadhesively coated material such as a release paper or a release film, also called liner.

The coatweight of the adhesive on the web-form carrier material may advantageously be between 1 and 1000 g/m$^2$, preferably between 10 and 300 g/m$^2$, more preferably 100-150 g/m$^2$.

FIELDS OF APPLICATION

The scope for use of the single-sided and double-sided, saccharide-modified pressure sensitive adhesive products claimed in accordance with the invention is large. The focus here is on application in visible bonds such as in optical and electronic applications, for example, or in the construction industry, in architectural facing bonds, for example. Preference is given to employing the substantial design forms (comprising double-sided, single-layer, carrierless adhesive transfer strips, with one or two antiadhesively coated outer plies (release liners), double-sided two-layer or multilayer adhesive strips with a single-layer or multilayer carrier and with one or two antiadhesively coated outer plies (release liners), and also single-sidedly pressure sensitively adhesive strips having a single-layer or multilayer carrier and having one antiadhesively coated outer ply (release liner)) for application in display panel bonds, touch sensors/panels, coverglass bonds or surface protection strips, this enumeration not being conclusive.

The invention therefore further relates in particular to the use of such a pressure sensitive adhesive, particularly in the form of a pressure sensitive adhesive tape comprising at least one layer of this pressure sensitive adhesive—as set out in the above part of this specification in one of its embodiments—in the electronics industry and/or for bonding two substrates to one another to form an assembly, the assembly being part of an optical, electronic and/or precision-mechanical device, more particularly of a portable optical, electronic or precision-mechanical device.

There is advantage in using the pressure sensitive adhesive of the invention when at least one of the substrates is transparent or translucent—such as, for example, glass or plastics, such as Plexiglas—; and especially when the transparent or translucent substrate is a window or a lens for protecting components disposed beneath it and/or for producing physico-optical effects for the function of the optical, electronic or precision-mechanical device.

In this context, the—in particular, portable—optical, electronic or precision-mechanical device may for example be selected from the group encompassing:

cameras, digital cameras, photographic accessories (such as light meters, flash devices, diaphragms, camera casings, lenses, etc.), film cameras, video cameras, digicams, distance vision devices, night vision devices, computers, laptops, notebooks, netbooks, ultrabooks, tablet computers, devices with touch-sensitive screens (touchscreen devices), handhelds, electronic diaries and organizers (known as electronic organizers or personal digital assistants, PDAs), writing machines, modems, computer accessories, such as mice, drawing pads, microphones, speakers, reading devices for electronic books (e-books), televisions (including mini-televisions), film players, video players, monitors, screens, displays, projectors, radios, Walkmans, music players (e.g., CD, DVD, Bluray, cassettes, USB, MP3 players), headphones, printers, faxes, copiers, telephones, cellphones, smartphones, two-way radios, hands-free devices, defibrillators, blood sugar meters, blood pressure monitors, battery chargers, measuring instruments, multimeters, lamps, such as torches, laser pointers, etc, detectors, optical magnifiers, calculators, remote controls, remote operation devices, games consoles, GPS devices, navigation devices, devices for summoning people (pagers, bleepers), data storage devices (USB sticks, external hard drives, memory cards), wristwatches, pocket watches, chain watches.

LIST OF ABBREVIATIONS $A_\lambda$—absorbance
a*—green-red value
AIBN—azodiisobutyronitrile
b*—yellow-blue value
c—concentration
d—path length/layer thickness of material
DACP—Diacetone Alcohol Cloud Point
$\varepsilon_\lambda$—attenuation coefficient
H—haze (large-angle scattering)
$I_0$—initial intensity
I—intensity after penetration of sample
L*—lightness
λ—wavelength
MMAP—Mixed Methylcyclohexane Aniline Point
n—refractive index
$T_{R\&B}$—ring-and-ball softening point (Herzog)
T—transparency
$\tau_\lambda$—transmittance Test Methods, Definitions of Parameter Data Test Method A—GPC:

The molecular weight distribution and, in conjunction with it, the number-average molecular weight distribution $M_n$, the weight-average molecular weight distribution $M_w$, and the maximum in the case of monomodal copolymers or the maxima in the case of bimodal or multimodal copolymers for the molecular weight distribution, $M_P$, were determined by gel permeation chromatography (GPC). The eluent used was THF with 0.1 vol % of trifluoroacetic acid. The measurement took place at 23° C. The precolumn used was PSS SDV, 10μ, $10^3$ Å, ID 8.0 mm×50 mm. Separation took place using the column combination PSS-SDV, 10μ, Linearone with ID 8.0 mm×300 mm. The sample concentration was 1 g/l, the flow rate 0.5 ml per minute. Measurement took place against polystyrene standards. MP values were determined graphically from the elugrams. Data processing took place using the WinGPC Unity Version 7.20 software from PSS.

Test Method B—Peel Adhesion:

For determining the peel adhesion (peel strength), the procedure, based on PSTC-1, is as follows: a pressure sensitive adhesive layer 50 μm thick is applied to a PET film 25 μm thick. A strip of this specimen 2 cm wide is adhered to a clean, ground steel plate by being rolled over back and forth five times using a 5 kg roller. The plate is clamped in and the self-adhesive strip is pulled off via its free end on a tensile testing machine using a peel angle of 180° and at a velocity of 300 mm/min. The results are reported in N/cm.

Test Method C—Microshear Travel:

In a method based on ASTM D 4498, the procedure adopted is as follows: a specimen 50 μm thick of an adhesive transfer tape is freed from the release liners and provided on one side, for stabilization, with an aluminum foil 50 μm thick. A test strip 10 mm in width and about 50 mm in length is adhered to a clean steel plate in such a way as to result in a bond area of 130 mm². The bond is produced by rolling a 2 kg weight back and forth three times. The steel plate is adjusted in the measurement apparatus so that the test strip is present in vertical position, and is conditioned at 30° C. The system is heated to 40° C. Using a clamp (itself weighing 6.4 g), a 500 g weight is affixed to the free end of the test strip, and loads the sample shearingly as a result of gravitation. A micrometer gauge is applied to a short section of the test adhesive strip, projecting beyond the steel plate, and this gauge records the deflection as a function of the measuring time. The result for the microshear travel is the value recorded after a measuring time of 60 minutes. Also recorded is the elasticity, by desuspending the weight after the shearing stress and monitoring the relaxation of the adhesive strip. After a further 60 minutes, the micrometer gauge value is recorded and expressed as a percentage of the microshear travel under load. A high percentage value indicates a high elasticity, corresponding to high resilience on the part of the sample.

Test Method D—Chromaticity Coordinates (L*, a*, b):

The procedure adopted was in accordance with DIN 6174, and the color characteristics in three-dimensional space, governed by the three color parameters L*, a* and b*, in accordance with CIELab, were investigated. This was done using a BYK Gardener spectro-guide instrument, equipped with a D/65° lamp. Within the CIELab system, L* indicates the gray value, a* the color axis from green to red and b* the color axis from blue to yellow. The positive value range for b* indicates the intensity of the yellow color component. Serving as a reference was a white ceramic tile with a b* of 1.05. This tile further acted as a sample mount, to which the adhesive layer under test is laminated. Color measurement takes place on the pure adhesive layer in each case after the layer has been freed from the release liners.

Test Method E—Haze (Large-Angle Scattering), Transmittance:

Transmittance and haze were determined in accordance with ASTM D1003 on a hazegard plus from Byk-Gardner. The procedure used for this was that of ASTM D1003, with specimens of the double-sided, pressure sensitively adhesive products first being freed from the release liners and applied to the specimen mount.

Test Method F—Refractive Index:

The refractive index n was measured using the Optronic instrument from Krüss at 25° C. using white light (λ=550 nm±150 nm) according to the Abbe principle. For temperature stabilization, the instrument was operated in conjunction with a thermostat from Lauda. To produce the specimens of pressure sensitive adhesive layer, adhesive was coated onto a release liner, dried, and lined with a second release liner. For the measurement, both release liners were removed. To produce the carrier layer specimens, the original formulation was coated onto a release liner and dried. For the measurement, the release liner was removed. In the case of the carrier layer specimen present in the form of a film, a section of this material was measured without further pretreatment. The measurements were carried out in triplicate on each sample; the results obtained were averaged.

Test Method G—MMAP

The mixed methylcyclohexane aniline point (MMAP) of a test substance (resin), as a measure of its aliphatic and/or aromatic nature (solubility), is determined in accordance with the Hercules in-house method "H90-5". 10.00±0.01 g of test substance are added at elevated temperature in a mixture of precisely 10.0 ml of methylcyclohexane (anhydrous, boiling point=101° C., density (23° C.)=0.77 g/cm$^3$, from e.g. Aldrich #30.030-6 with an aniline point of 39.9+–0.1° C.) and precisely 5.0 ml of aniline (refractive index (20° C.)=1.5863, boiling point=184° C., density (23° C.)=1.02 g/cm$^3$, from e.g. Aldrich # H 4, 154-4). In the Chemotronic Cool—Automatic Turbidity Analyzer –50° C.-+250° C. from novo matics, the hot sample is cooled with stirring at 1 K/min. The temperature at which the resin becomes insoluble and clouding of 75% is attained is reported as the mixed methylcyclohexane aniline point.

Test Method H—DACP

The Diacetone Alcohol Cloud Point (DACP) of a test substance (resin), as a measure of its polarity (solubility), is determined in accordance with the Hercules in-house method "H90-4a". 5.00±0.01 g of test substance are dissolved at elevated temperature in precisely 5.0 g (about 5.8 ml) of xylene (isomer mixture, nD20=1.4970, boiling point=137-144° C., density (23° C.)=0.860 g/cm$^3$, from e.g. Aldrich #32,057-9). When the resin is dissolved, the solution can be cooled to about 80° C. and the quantity of xylene lost through evaporation is replenished. Thereafter precisely 5.0 g (about 5.37 ml) of diacetone alcohol (4-hydroxy-4-methyl-2-pentanone, 99% (GC), boiling point=166° C., density (23° C.)=0.931 g/cm$^3$, from e.g. Aldrich # H 4,154-4) are added. In the Chemotronic Cool—Automatic Turbidity Analyzer –50° C.-+250° C. from novo matics, the hot sample is cooled with stirring at 1 K/min. The temperature at which the resin becomes insoluble and clouding of 75% is attained is reported as the Diacetone Alcohol Cloud Point.

Test Method J=UV-Vis

The absorption in the UV wavelength range was determined by means of a Specord 250plus UV/VIS spectrometer (Analytik Jena).

Determination of Softening Point (Herzog)

Softening points ($T_{R\&B}$) were determined in accordance with ASTM standard D36/D36M using the Softening Point Tester Ring and Ball HRB 754 instrument from herzog. For duplicate determination, two samples were prepared and tested simultaneously. The rings were filled at elevated temperature with softened resin and cooled back down to room temperature. In the determination of this value, in each case one steel ball (diameter=9.8 mm, weight=3.5 g) was placed onto the sample layer applied in a ring. In the course of the experiment, the material is heated at a uniform rate (5 K/min) in a glycerol bath. When the sample has bowed downward by 25.4±0.2 millimeters (detected via a light barrier), the corresponding temperature was recorded.

Determination of Glass Transition Point

The static glass transition temperature is determined by Dynamic Scanning calorimetry in accordance with DIN 53765. The figures for the glass transition temperature Tg are based on the DIN 53765:1994-03 glass transformation temperature value Tg, unless specifically indicated otherwise.

Experiments

Commercially Available Chemicals Used

| Chemical compound | Trade name | Manufacturer | CAS No. |
|---|---|---|---|
| Bis(4-tert-butylcyclohexyl) peroxydicarbonate | Perkadox ® 16 | Akzo Nobel | 15520-11-3 |
| 2,2'-Azobis(2-methylpropionitrile), AIBN | Vazo ® 64 | DuPont | 78-67-1 |
| Bisphenol A diglycidyl ether | BFDGE | Sigma-Aldrich | 1675-54-3 |
| Aliphatic polyisocyanate polymer (solution) | Desmodur N75 | Bayer Material-Science AG | 11132-83-5 |
| Aromatic polyisocyanate based on toluene diisocyanate | Desmodur L75 | Bayer Material-Science AG | 9081-90-7 |
| Aluminum(III) acetylacetonate | | Sigma-Aldrich | 13963-57-0 |

-continued

| Chemical compound | Trade name | Manufacturer | CAS No. |
|---|---|---|---|
| Zinc(II) chloride | | Sigma-Aldrich | 7646-85-7 |
| Sucrose octabenzoate | | Sigma-Aldrich | 12738-64-6 |
| α-D-Glucopyranose pentabenzoate | | Sigma-Aldrich | 22415-91-4 |
| β-D-(+)-Glucose pentaacetate | | Sigma-Aldrich | 604-69-3 |
| Sucrose octaacetate | | Sigma-Aldrich | 126-14-7 |
| Terpene-phenolic resin | Dertophene T 110 | DRT | 25359-84-6 |
| Aromatic hydrocarbon resin | Kristalex F85 | Eastman Chemical | 9011-11-4 |
| Acrylate resin | Paraloid DM-55 | DOW | |
| Hydrogenated rosin | Pinecrystal KE-311 | Arakawa Chemical Industries, Ltd. | |
| Terphene-phenol-styrene resin | Sylvares 520 | Arizona Chemical Company LLC | |
| Hydrogenated polyterpene resin | Clearon P105 | Yasuhara Chemical | 106168-39-2 |
| UV protectant | Tinuvin 571 0.50% | | |
| Antioxidant | Weston 399 0.50% | | |
| Antioxidant | Irganox 3052 0.50% | | |
| Pentaerythritol tetraglycidyl ether | Polypox ® R16 | UPPC AG | 3126-63-4 |
| 6-Phenyl-1,3,5-triazine-2,4-diyldiamine | Benzoguanamine | AlzChem | 91-76-9 |
| Titanium dioxide | Ti-Pure-R-105 | Chemorus | 13463-67-7 |
| 3-Aminomethyl-3,5,5-trimethylcyclohexylamine | Isophoronediamine | Möller Chemie | 2855-13-2 |

Provision of Acrylate Polymer A

A 2 l steel reactor suitable for radical polymerization is charged under a nitrogen atmosphere with a monomer mixture consisting of 7 wt % of acrylic acid, 25% of methyl acrylate and 68 wt % of 2-ethylhexyl acrylate, and 233 wt % of ethyl acetate/acetone (96:4), based on 100 wt % monomer fraction, are provided. The reactor is heated to an internal temperature of 60° C. and the monomer mixture is initiated in several steps under nitrogen with a total of 0.25 wt % of AIBN, based on 100 wt % monomer fraction. Five and seven hours later, initiation is repeated with in each case 0.15 wt % of Perkadox 16. After a total of twenty one hours, the reaction mixture is cooled and the water-clear polymer solution with 32 wt % solids fraction of A is drained off. A sample of the product is freed from the solvent under reduced pressure. GPC analysis (test method A) of polymer A gave a molecular weight distribution with Mw=657 000 g/mol and a polydispersity of 8.2, a K value of 51. The Tg was −37° C.

Provision of Acrylate Polymer B

A 2 l steel reactor suitable for radical polymerization is charged under a nitrogen atmosphere with a monomer mixture consisting of 20 wt % of 2-hydroxyethyl acrylate, 40 wt % of n-butyl acrylate and 40 wt % of 2-ethylhexyl acrylate, and 150 wt % of solvent (ethyl acetate/toluene in a ratio of 70:30), based on 100 wt % monomer fraction, are provided. The reactor is heated to an internal temperature of 58° C. and the monomer mixture is initiated in several steps under nitrogen with a total of 0.25 wt % of AIBN, based on 100 wt % monomer fraction. In the course of the reaction the reaction mixture is heated up to 65° C. Five and seven hours after the start, initiation is repeated with in each case 0.15 wt % of Perkadox 16. After twenty one hours, the reaction mixture is cooled and the water-clear polymer solution B with 27 wt % solids fraction is drained off. A sample of the product is freed from the solvent under reduced pressure. GPC analysis of B gave a molecular weight distribution with Mw=1 050 000 g/mol, a polydispersity of 18.3, a K value of 73. The Tg was −47° C.

Provision of Acrylate Polymer C

A 2 l steel reactor suitable for radical polymerization is charged under a nitrogen atmosphere with a monomer mixture consisting of 1 wt % of acrylic acid, 2 wt % of glycidyl methacrylate, 30 wt % of n-butyl acrylate and 67 wt % of 2-ethylhexyl acrylate, and 67 wt % of solvent (acetone/isopropanol, 94:6), based on 100 wt % monomer fraction, are provided. The reactor is heated to an internal temperature of 58° C. and the monomer mixture is initiated in several steps under nitrogen with a total of 0.25 wt % of AIBN, based on 100 wt % monomer fraction, and later there is conditioning to 65° C. Five and seven hours later, initiation is repeated with in each case 0.15 wt % of Perkadox 16, and also dilution with solvent is carried out multiply as and when required. After twenty one hours, the reaction mixture is cooled and the water-clear polymer solution C with 30 wt % solids fraction of C is drained off. A sample of the product is freed from the solvent under reduced pressure. GPC analysis of C gave a molecular weight distribution with Mw=1 115 000 g/mol, a K value of 89, and a Tg of −51° C.

Provision of Acrylate Polymer D

A steel reactor suitable for radical polymerization is charged under a nitrogen atmosphere with 100 g of monomer mixture consisting of 5 wt % of acrylic acid, 30 wt % of 2-ethylhexyl acrylate and 67% of n-butyl acrylate, and 66 wt % of acetone/isopropanol (95:5), based on 100 wt % monomer fraction, are provided. The reactor is heated to an internal temperature of 60° C. and the monomer mixture is initiated in several steps under nitrogen with a total of 0.1 wt % of AIBN, based on 100 wt % monomer fraction. Five and seven hours later, initiation was repeated with in each case 0.15% of Perkadox 16. After a total of twenty one hours, the reaction mixture is cooled and the water-clear polymer solution D with 44 wt % solids fraction of D is drained off. A sample of the product D is freed from the solvent under reduced pressure. GPC analysis of polymer D gave a molecular weight distribution with Mw=974 000 g/mol, a polydispersity of 12, a K value of 70, and a Tg of −45° C.

Provision of Acrylate Polymer E

A 2 l steel reactor suitable for radical polymerization is charged under a nitrogen atmosphere with a monomer mixture consisting of 10 wt % of acrylic acid and 90% of 2-hydroxyethyl acrylate, and 60 wt % of solvent (acetone/isopropanol, 94:6), based on 100 wt % monomer fraction, are provided. The reactor is heated to an internal temperature of 58° C. and the monomer mixture is initiated in several steps under nitrogen with a total of 0.25 wt % of AIBN, based on 100 wt % monomer fraction. During the reaction the mixture is heated up to 65° C. Dilution is carried out as and when required, and five and seven hours after the start, initiation is repeated with in each case 0.15 wt % of Perkadox 16. After twenty one hours, the reaction mixture is cooled and the water-clear polymer solution with 33 wt % solids fraction of E is drained off. A sample of the product E is freed from the solvent under reduced pressure. GPC analysis gave a molecular weight distribution with Mw=1 210 000 g/mol, a K value of 87, and a Tg of −48° C.

Example 1:—Adhesive K(A)

In a glass vessel suitable for the purpose, 250 g of polyacrylate solution A with a solids fraction of 32 wt % together with 20 wt %, based on total solids content, of sucrose octabenzoate (Sigma-Aldrich) are dissolved together with 40 g of butanone. The resulting solventborne PSA K(A) is crosslinked with 0.07 wt % of BFDGE, based on solids of A, knife-coated out onto a siliconized polyester film 50 μm thick, and dried in a drying cabinet. The layer thickness of the pressure sensitive adhesive layer obtained was 100 μm. It is lined with a ply of a siliconized polyester liner 36 μm thick. In this way an adhesive transfer film was obtained.

Correspondingly dimensioned strips are subjected to test methods B and C. This gave a peel adhesion (steel) of 8.4 N/cm, a peel adhesion (glass) of 4.7 N/cm, a peel adhesion (PE) of 1.1 N/cm, a maximum microshear travel of 90 μm, and an elastic fraction of 62%. Color measurement according to test method D (specimens of the pressure sensitive adhesive layer 100 μm thick, dimensions 5 cm×5 cm) gave an L* value of 99.9, an a* value of −0.03, a b* value of 0.12, and a haze measurement by test method E gave a haze value of 0.1%. The specimens did not give off any significant odor. After four weeks of heat-and-humidity storage (85° C., 85% relatively humidity), a b* value of 0.8 and a haze value of 0.1% were found. After one week under UV irradiation, a b* value of 0.7 and a haze value of 0.1% were found.

Example 2:—Adhesive K(B)

In a glass vessel suitable for the purpose, 259.3 g of polyacrylate solution B with a solids fraction of 27 wt % are dissolved together with—based on total solids content—10 wt % of sucrose octabenzoate, 10 wt % of sucrose octaacetate and 10 wt % of glucose pentabenzoate. The resulting pressure sensitive adhesive formulation is crosslinked with 0.6% of Desmodur N75, based on the polymer fraction, in solution in 10.7 g of toluene, knife-coated out onto a siliconized polyester film 50 μm thick, and dried in a drying cabinet. The layer thickness of the pressure sensitive adhesive layer of K(B) was 100 μm. It is lined with a ply of a siliconized polyester liner 36 μm thick.

In this way an adhesive transfer film was obtained. Correspondingly dimensioned strips are subjected to test methods B and C. This resulted in a peel adhesion (steel) of 7.5 N/cm, a peel adhesion (glass) of 5.3 N/cm, a peel adhesion (PMMA) of 6.4 N/cm, a peel adhesion (PE) of 1.2 N/cm, a maximum microshear travel of 120 μm, and an elastic fraction of 82%. The holding power was >10 000 minutes.

Color measurement by test method D (specimens of the pressure sensitive adhesive layer 100 μm thick, dimensions 5 cm×5 cm) gave an L* value of 99.6, an a* value of −0.04, a b* value of 0.2, and a haze measurement by test method E gave a haze value of 0.2%. The specimens did not give off any odor. After four weeks of heat-and-humidity storage (85° C., 85% relatively humidity), a b* value of 0.3 and a haze value of 0.2% were found. After one week under UV irradiation, a b* value of 0.9 and a haze value of 0.2% were found.

Example 3:—Adhesive K(C)

In a glass vessel suitable for the purpose, 216.7 g of polyacrylate solution C are dissolved together with—based on total solids content—15 wt % of sucrose octabenzoate and 20 wt % of Pinecrystal KE-311 in 200 ml of butanone. The resulting solventborne PSA is crosslinked with 1.95 g of ZnCl2 solution (10 wt % in isopropanol) and 0.975 g of Desmodur L75 solution (10 wt % in ethyl acetate/toluene, ratio 1:8), knife-coated out onto a siliconized polyester film 50 μm thick, and dried in a drying cabinet. The layer thickness of the pressure sensitive adhesive layer was 100 μm. It is lined with a ply of a siliconized polyester liner 36 μm thick. In this way an adhesive transfer film was obtained. Correspondingly dimensioned strips are subjected to test methods B and C. This resulted in a peel adhesion (steel) of 12 N/cm, a peel adhesion (glass) of 6.8 N/cm, a peel adhesion (PE) of 3.3 N/cm, a maximum microshear travel of 350 μm, and an elastic fraction of 71%. The holding power was 1800 minutes.

Color measurement by test method D (specimens of the pressure sensitive adhesive layer 100 μm thick, dimensions 5 cm×5 cm) gave an L* value of 99.7, an a* value of −0.1, a b* value of 0.4, and a haze measurement by test method E gave a haze value of 0.26%. The specimens did not give off any odor. After four weeks of heat-and-humidity storage (85° C., 85% relatively humidity), a b* value of 0.9 and a haze value of 0.3% were found. After one week under UV irradiation, a b* value of 0.8 and a haze value of 0.27% were found.

Example 4: Adhesive K(D)

In a blending tank suitable for the purpose, 147.7 kg of the polyacrylate composition D with a solids content of 44% are dissolved together with 20 wt % (based on total solids content) of sucrose octabenzoate and 10 wt % of Kristalex F85. The resulting solventborne PSA is further blended with 0.5 wt % each of Tinuvin 571 UV protectant, Weston 399 antioxidant and Irganox 3052 antioxidant. The solvent is subsequently removed on a single-screw extruder (concentrating extruder, BERSTORFF GmbH, Germany) (residual solvent content 0.3 wt %; cf. the individual examples). The speed of the screw was 150 rpm, the motor current was 15 A, and a liquid throughput of 58.0 kg/h was realized. For concentration, reduced pressure was applied at three different domes. The reduced pressures were in each case between 20 mbar and 300 mbar. The exit temperature of the concentrated hotmelt is about 115° C. The solids content after this concentration step was 99.8%.

A color measurement by test method D (specimens of the pressure sensitive adhesive layer 100 μm thick, dimensions 5 cm×5 cm) gave a b* value of 0.1 and a haze measurement according to test method E gave a haze value of 0.3%.

Example 5: Hotmelt PSA K(DD)

The adhesive K(D) concentrated in accordance with example 4 above was conveyed directly into a downstream WELDING twin-screw extruder (WELDING Engineers, Orlando, USA; model 30 MM DWD; screw diameter 30 mm, screw 1 length=1258 mm; screw 2 length=1081 mm; three zones). Via the solids metering system, and based on the overall mass of K(DD), 5 wt % of Ti-Pure-R-105 titanium dioxide filler was metered in as adjuvant and was mixed in homogeneously. For compounding, the parameters were selected such that the rotary speed was 451 rpm and the motor current was 42 A. A throughput of 30.1 kg/h was realized. The temperatures of zones 1 and 2 were each 105° C., the melt temperature in zone 1 was 117° C., and the temperature of the compound on exit (zone 3) was 100° C.

Example 6:—Crosslinked Adhesive K(DDD)

The acrylate hotmelt PSA K(DD) produced in accordance with the above-described method 5 was melted in a feeder extruder (single-screw conveying extruder from TRO-ESTER GmbH & Go KG, Germany) and using this extruder was conveyed as a polymer melt into a twin-screw extruder (from LEISTRITZ, Germany, ref. LSM 30/34). The assembly is heated electrically from the outside and is air-cooled by a number of fans, and is designed such that, with effective distribution of the crosslinker-accelerator system in the polymer matrix, there is at the same time a short residence time ensured for the adhesive in the extruder. For this purpose, the mixing screws of the twin-screw extruder were arranged in such a way that conveying elements are in alternation with mixing elements. The addition of the respective crosslinkers and accelerators is made with suitable metering equipment, at two or more locations and using metering assistants, into the unpressurized conveying zones of the twin-screw extruder. With the crosslinker-accelerator system used here, 0.22 wt % of Polypox R16 and 0.52 wt % of IPDA (based in each case on acrylate copolymer) were metered in.

Following the exit of the fully compounded adhesive, in other words of the adhesive blended with the crosslinker-accelerator system, from the twin-screw extruder (exit: circular die, 5 mm diameter), coating takes place between two rolls onto a carrier material in web form. (The two rolls are arranged in such a way as to form a nip into which the self-adhesive compound is introduced. The first roll (coating roll) carries the carrier (siliconized polyester film) onto the self-adhesive compound to be coated. The second roll (doctor roll) carries a second antiadhesively furnished auxiliary carrier (siliconized polyester liner) and presses onto the adhesive by means of the auxiliary carrier, so that the adhesive is deposited onto the carrier in the form of a layer. Subsequently the adhesive transfer tape, consisting of the layer of adhesive between two carriers, is guided out of the coating unit.)

The time between metered addition of the crosslinker-accelerator system up to shaping or coating is termed the processing time. The processing time indicates the period within which the adhesive, blended with the crosslinker-accelerator system, or the viscoelastic carrier layer, can be coated with a visually good appearance (gel-free, speck-free). Coating takes place with web speeds of between 1 m/min and 20 m/min.

In this way an adhesive transfer film was obtained. The thickness of the pressure sensitive adhesive layer was 100 μm. Correspondingly dimensioned strips are subjected to test methods B and C. This resulted in a peel adhesion (steel) of 7.2 N/cm, a peel adhesion (glass) of 4.9 N/cm, a peel adhesion (PMMA) of 4.8 N/cm, a peel adhesion (PE) of 1.8 N/cm, a maximum microshear travel of 123 μm, and an elastic fraction of 72%.

Color measurement by test method D (specimens of the pressure sensitive adhesive layer 100 μm thick, dimensions 5 cm×5 cm) gave a b* value of 0.17, and a haze measurement by test method E was not carried out. The specimens did not give off any odor. After four weeks of heat-and-humidity storage (85° C., 85% relatively humidity), a b* value of 0.9 was found. After a week under UV irradiation, a b* value of 0.8 was found.

Example 7:—Adhesive K(E)

In a glass vessel suitable for the purpose, 258 g of polyacrylate compound E with a solids fraction of 33% together with 10%, based on total solids content, of sucrose octabenzoate are dissolved and 5% of Paraloid DM-55 together with 27 g of butanone. The resulting solventborne PSA is crosslinked with 0.3% of aluminum acetylacetonate (3% strength solution in acetone), knife-coated out onto a siliconized polyester film 50 μm thick, and dried in a drying cabinet. The layer thickness of the pressure sensitive adhesive layer was 100 μm. It is lined with a ply of a siliconized polyester liner 36 μm thick. In this way an adhesive transfer film was obtained. Correspondingly dimensioned strips are subjected to test methods B and C. This gave a peel adhesion (steel) of 10.5 N/cm, a peel adhesion (glass) of 3.7 N/cm, a peel adhesion (PE) of 0.6 N/cm, a maximum microshear travel of 60 μm, and an elastic fraction of 83%.

Color measurement according to test method D (specimens of the pressure sensitive adhesive layer 100 μm thick, dimensions 5 cm×5 cm) gave an L* value of 99.6, an a* value of −0.02, a b* value of 0.08, and a haze measurement by test method E gave a haze value of 0.3%. The specimens did not give off any odor. After four weeks of heat-and-humidity storage (85° C., 85% relatively humidity), a b* value of 0.25 and a haze value of 0.3% were found. After one week under UV irradiation, a b* value of 0.3 and a haze value of 0.3% were found.

Counterexample X:—Adhesive K(X)

In a glass vessel suitable for the purpose, 159 g of polyacrylate solution A with a solids fraction of 44% together with, based on the total solids content 30% of Dertophene T 110 terpene-phenolic resin (DRT) are dissolved and 111 ml of butanone. The resulting solventborne PSA K(X) is crosslinked with 0.3% of aluminum acetylacetonate (3% strength solution in acetone), knife-coated out onto a siliconized polyester film 50 μm thick, and dried in a drying cabinet. The layer thickness of the pressure sensitive adhesive layer was 100 μm. It is lined with a ply of a siliconized polyester liner 36 μm thick. Correspondingly dimensioned strips are subjected to test methods B and C. This gave a peel adhesion (steel) of 8.7 N/cm, a peel adhesion (glass) of 5.7 N/cm, a peel adhesion (PE) of 2.3 N/cm, a maximum microshear travel of 180 μm, and an elastic fraction of 62%.

Color measurement according to test method D (specimens of the pressure sensitive adhesive layer 100 μm thick, dimensions 5 cm×5 cm) gave an L* value of 99.4, an a* value of −0.8, a b* value of 3.7, and a haze measurement by test method E gave a haze value of 0.5%. The specimens did not give off any significant odor. After four weeks of heat-and-humidity storage (85° C., 85% relatively humidity), a b* value of 14.2 and a haze value of 0.5% were found. After a week under UV irradiation, a b* value of 15.3 and a haze value of 0.5% were found.

Counterexample Y:—Provision of Adhesive K(Y)

In a glass vessel suitable for the purpose, 159 g of polyacrylate solution A with a solids fraction of 44% together with, based on the total solids content 30% of Sylvares 520 styrene-modified terpene-phenolic resin (Arizona Chemical) are dissolved and 111 ml of butanone. The resulting solventborne PSA K(Y) is crosslinked with 0.3% of aluminum acetylacetonate (3% strength solution in acetone), knife-coated out onto a siliconized polyester film 50 μm thick, and dried in a drying cabinet. The layer thickness of the pressure sensitive adhesive layer was 100 μm. It is lined with a ply of a siliconized polyester liner 36 μm thick. In this way an adhesive transfer film was obtained.

Correspondingly dimensioned strips are subjected to test methods B and C. This gave a peel adhesion (steel) of 7.6 N/cm, a peel adhesion (glass) of 5.0 N/cm, a peel adhesion (PE) of 1.9 N/cm, a microshear travel of 257 μm, and an elastic fraction of 71%. Color measurement according to test method D (specimens of the pressure sensitive adhesive layer 100 μm thick, dimensions 5 cm×5 cm) gave a b* value of 1.0, and a haze measurement by test method E gave a haze value of 0.7%. The specimens gave off a slight odor. After 4 weeks of heat-and-humidity storage (85° C., 85% relatively humidity), a b* value of 11.8 and a haze value of 1.0% were found. After one week under UV irradiation, a b* value of 12.0 and a haze value of 0.7% were found.

Counterexample Z:—Provision of Adhesive K(Z)

In a glass vessel suitable for the purpose, 212 g of polyacrylate solution AA with a solids fraction of 33% together with, based on the total solids content, 30% of Clearon P 115 hydrocarbon resin are dissolved and 78 ml of butanone. The resulting solventborne PSA K(Z) is crosslinked with 0.3% of aluminum acetylacetonate (3% strength solution in acetone), knife-coated out onto a siliconized polyester film 50 μm thick, and dried in a drying cabinet. The layer thickness of the pressure sensitive adhesive layer was 100 μm. It is lined with a ply of a siliconized polyester liner 36 μm thick. In this way an adhesive transfer film was obtained.

The swatch specimens exhibit clouding which is clearly visible to the naked eye, with a haze value of 7.2%; the b* value according to test method D (specimens of the pressure sensitive adhesive layer 100 μm thick, dimensions 5 cm×5 cm) was 0.17. The counterexample demonstrates that a combination of colorlessly clear resin with colorlessly clear polymer does not necessarily lead to a colorlessly clear adhesive.

Results

Example 1 shows that the PSA of the invention comprising saccharide derivatives possesses outstanding properties. The film obtained is particularly colorless and transparent and has very low haze and b* values. The films are stable to aging and stable in terms of color, since there is no significant change in color or haze either after temperature storage or after UV irradiation.

Example 2 shows a further implementation of the invention, in which the PSA is free of acrylic acid. A mixture of saccharide derivatives is used. The film obtained is particularly colorless and transparent and has very low haze and b* values.

The films are stable to aging and stable in terms of color, since there is no significant change in color or haze either after temperature storage or after UV irradiation.

Example 3 shows a PSA of the invention based on a (meth)acrylate polymer with a saccharide derivative and a rosin. The crosslinking system used is copolymerized glycidyl methacrylate together with ZnCl. The film obtained is particularly colorless and transparent and has very low haze and b* values. The adhesive films are stable to aging and stable in terms of color, since there is no significant change in color or haze either after temperature storage or after UV irradiation.

Example 4 shows the use of saccharide derivatives together with hydrocarbon resins in a hotmelt-based PSA. In spite of severe thermal loading, a particular colorless and transparent system is obtained, with very low haze and b* values.

Example 6 shows the use of saccharide derivatives in hotmelt-based PSAs based on acrylate polymers together with white pigments and also colorless adjuvants (colorless resin). A particularly white PSA is obtained, with very low b* values. The adhesive films are stable to aging and stable in terms of color, since there is no significant change in color either after temperature storage or after UV irradiation.

Example 7 shows the use of the saccharide derivatives and of an acrylate resin together with a chelate crosslinker system in the PSA of the invention. The film obtained is particularly colorless and transparent and has very low haze and b* values. The films are stable to aging and stable in terms of color, since there is no significant change in color or haze either after temperature storage or after UV irradiation.

Counterexample X shows in comparison the use of a terpene-phenolic resin together with an acrylate polymer. The resulting film is not colorless (high b* value). The films are neither stable to aging nor stable in terms of color, since after temperature storage or after UV irradiation there is significant change in color and/or haze.

Counterexample Y shows in comparison the use of a colorless terpene-phenolic resin together with an acrylate polymer. The resulting film is indeed colorless and transparent, but the films are neither stable to aging nor stable in terms of color, since after temperature storage or after UV irradiation there is significant change in color and/or haze (yellowing after aging).

Counterexample Z shows in comparison the use of a colorless hydrocarbon resin together with an acrylate polymer. A colorless film is indeed obtained, but the film is not transparent and there is hazing because of an incompatibility after drying/coating.

The invention claimed is:

1. A pressure-sensitive adhesive comprising:
at least 30 wt %, based on the weight of the pressure-sensitive adhesive, of a polymer component; and
up to 50 wt %, based on the weight of the pressure-sensitive adhesive, of a saccharide component,
wherein the saccharide component is formed of:
at least one first modified saccharide derivative derived from at least one first monosaccharide, at least one first disaccharide, at least one first oligosaccharide, or at least one first polysaccharide by modification of at least one hydroxyl group present in the at least one first monosaccharide, the at least one first disaccharide, the at least one first oligosaccharide, and the at least one first polysaccharide;

at least one second modified saccharide derivative derived from at least one second monosaccharide, at least one second disaccharide, at least one second oligosaccharide, or at least one second polysaccharide by modification of at least one hydroxyl group present in the at least one second monosaccharide, the at least one second disaccharide, the at least one second oligosaccharide, and the at least one second polysaccharide;

and wherein the ratio of the at least one first modified saccharide derivative to the at least one second modified saccharide derivative is between 1:9 and 1:1.

2. The pressure-sensitive adhesive as claimed in claim 1, wherein the saccharide component is present at 5 to 40 wt % based on the weight of the pressure-sensitive adhesive.

3. The pressure-sensitive adhesive as claimed in claim 1, wherein the saccharide component is further formed of at least one third modified saccharide derivative.

4. The pressure-sensitive adhesive as claimed in claim 1, wherein:

the at least one first modified saccharide derivative comprises a chemically-functionalized hydroxyl group; or
the at least one first modified saccharide derivative comprises a chemically-functionalized carbon atom bound to a hydroxyl group.

5. The pressure-sensitive adhesive as claimed in claim 1, wherein at least one of the at least one first modified saccharide derivative and the at least one second modified saccharide derivate comprises glucose acetate, glucose benzoate, sucrose acetate, sucrose benzoate, olestra, or a mixture thereof.

6. The pressure-sensitive adhesive as claimed in claim 1, wherein the saccharide component is further formed from at least one of:

at least one third monosaccharide;
at least one third disaccharide;
at least one third oligosaccharide; or
at least one third polysaccharide.

7. The pressure-sensitive adhesive as claimed in claim 1, wherein the saccharide component is further formed from at least one fourth modified saccharide derivative.

8. A method comprising bonding a first substrate to a second substrate with the pressure-sensitive adhesive of claim 1, thereby forming an assembly, wherein the assembly is part of at least one of an optical device, an electronic device, and a precision mechanical device.

9. The method as claimed in claim 8, wherein the at least one of an optical device, the electronic device, and the precision mechanical device is portable.

10. The method as claimed in claim 9, wherein the at least one optical device, the electronic device, and the precision mechanical device is selected from the group consisting of a a-camera, a digital camera, a photographic accessory, a film camera, a video camera, a distance-vision device, a night-vision device, a computer, a laptop, a notebook computer, a tablet computer, a device with a touch-sensitive screen, a handheld computer, an electronic diary, an electronic organizer, a writing machine, a modem, a computer accessory, a reading device for an electronic book, a television, a film player, a video player, a monitor, a screen, a display, a projector, a radio, a portable music player, a music player, a pair of headphones, a printer, a facsimile machine, a copier, a telephone, a cell phone, a smart phone, one half of a two-way radio, a hands-free device, a defibrillator, a blood-sugar meter, a blood-pressure monitoring device, a battery charger, a measuring instrument, a multimeter, a lamp, a detector, an optical a-magnifier, a calculator, a remote control, a remote-operation device, a game console, a global positioning system device, a navigation device, a device for summoning a person, a data storage device, a wristwatch, a pocket watch, and a chain watch.

11. The method as claimed in claim 8, wherein at least one of the first substrate and the second substrate is transparent or translucent.

12. The method as claimed in claim 11, wherein the at least one of the first substrate and the second substrate is a window or a lens for protecting a components situated beneath the window or the lens, or for producing a physico-optical effect in connection with at least one optical device, the electronic device, and the precision mechanical device.

* * * * *